(12) United States Patent
Canton (10) Patent No.: US 10,430,441 B1
(45) Date of Patent: Oct. 1, 2019

(54) TAGGING RESOURCES OF A REMOTE COMPUTING SERVICE BASED ON LOCALITY

(71) Applicant: Amazon Technologies, Inc., Seattle, WA (US)

(72) Inventor: Jeffrey Cicero Canton, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 532 days.

(21) Appl. No.: 14/830,093

(22) Filed: Aug. 19, 2015

(51) Int. Cl.
*G06F 16/00* (2019.01)
*G06F 16/28* (2019.01)
*H04L 29/06* (2006.01)
*G06F 16/29* (2019.01)
*G06F 16/901* (2019.01)
*G06F 16/9535* (2019.01)
*G06F 16/2455* (2019.01)

(52) U.S. Cl.
CPC ...... *G06F 16/285* (2019.01); *G06F 16/24564* (2019.01); *G06F 16/29* (2019.01); *G06F 16/9024* (2019.01); *G06F 16/9535* (2019.01); *H04L 63/101* (2013.01)

(58) Field of Classification Search
CPC .. G06F 3/0481; G06F 3/0482; G06F 3/04842; G06F 9/541; G06F 16/285; G06F 16/9535; G06F 16/24564; G06F 16/29; G06F 16/9024; H04L 41/0896; H04L 63/101

USPC ......................................................... 707/740
See application file for complete search history.

(56) References Cited

U.S. PATENT DOCUMENTS

| | | | |
|---|---|---|---|
| 2009/0150399 A1* | 6/2009 | Patel | G06F 17/30132 |
| 2010/0199260 A1* | 8/2010 | Duggal | G06F 8/20 717/106 |
| 2012/0011360 A1* | 1/2012 | Engels | H04L 9/006 713/166 |
| 2012/0210066 A1* | 8/2012 | Joshi | G06F 12/0866 711/118 |
| 2013/0212484 A1* | 8/2013 | Joshi | G06F 9/541 715/740 |
| 2013/0212486 A1* | 8/2013 | Joshi | H04W 4/02 715/744 |
| 2014/0207861 A1* | 7/2014 | Brandwine | H04L 51/32 709/204 |

(Continued)

*Primary Examiner* — Hanh B Thai
(74) *Attorney, Agent, or Firm* — Eversheds Sutherland (US) LLP (57) ABSTRACT

Certain embodiments of the systems and methods described herein are directed to tagging resources of a remote computing service based on locality. In some embodiments, the locality tags may be used to indicate a locality of the resource and/or to identify resources of the remote computing service based on a specified type of locality (e.g., network, geographic, etc.). A user may receive a listing of resources based on the specified locality, which may allow the user to more effectively or efficiently initiate or execute actions using the remote computing service. In some embodiments, the remote computing service may generate a locality graph using the listing of the resources and may provide services based on the locality graph, such as automatic access control of resources and/or configuration of dynamic alarms associated with the resources.

20 Claims, 5 Drawing Sheets

(56) References Cited

U.S. PATENT DOCUMENTS

| | | | |
|---|---|---|---|
| 2015/0120749 A1* | 4/2015 | Phanishayee | G06F 17/30321 |
| | | | 707/741 |
| 2016/0034305 A1* | 2/2016 | Shear | G06F 9/50 |
| | | | 707/722 |
| 2016/0197880 A1* | 7/2016 | Korman | H04L 41/12 |
| | | | 709/226 |
| 2017/0048160 A1* | 2/2017 | Wu | H04L 67/16 |

* cited by examiner

| OBJECT ID | TAG | |
|---|---|---|
| | KEY | VALUE |
| bucket_1 | locality_network | = 10.0.0.0/24 |
| machineimage_1 | locality_network | = 10.0.0.0/24 |
| RDS_1 | locality_network | = 10.0.1.0/24 |

| OBJECT ID | TAG | |
|---|---|---|
| | KEY | VALUE |
| bucket_2 | locality_geo | = us-east-1 |
| machineimage_2 | locality_geo | = us-west-1 |
| RDS_2 | locality_geo | = us-west-2 |

TAGGING RESOURCES OF A REMOTE COMPUTING SERVICE BASED ON LOCALITY

BACKGROUND

Remote computing services (also called "web services") may enable network access to a shared pool of configurable computing resources, which may provide a remote computing platform to users. Examples of remote computing services may include access to servers, databases, and other resources that may be used for computing, application execution, networking, content storage, content delivery, database management, or the like, and may include services for websites or client-side applications. The remote computing platform may have one or more associated devices located in a single or multiple geographic locations.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Certain embodiments of the disclosure relate to systems and methods for tagging resources of a remote computing service based on locality. In some embodiments, the locality tags may be used to indicate a locality of the resource and/or to identify resources of the remote computing service based on a specified type of locality (e.g., network, geographic, etc.). A user may receive a listing of resources based on the specified locality, which may allow the user to more effectively or efficiently initiate or execute actions using the remote computing service. In some embodiments, the remote computing service may generate a locality graph using the listing of resources and may provide services based on the locality graph, such as automatic access control of resources and/or configuration of dynamic alarms associated with the resources.

A tag (or "resource tag") may be metadata associated with an object and may include a key-value pair (also referred to as a "name-value pair"). Tags enable users to categorize resources in different ways, for example, by purpose, owner, or environment. Each tag may include a key and, in some instances, an optional value, both of which may be defined by a user. A tag may be associated with a resource using a resource identifier associated with the resource. The association of the resource identifier and a particular tag may be stored in a database, which may be accessed by different services of the remote computing service. The key (or "name") may be the name used to identify the tag, and the value may be a string value for the tag. For example, a tag may include the key-value pair "User_Account/1234567," where the name of the tag is "User_Account" and the value for the tag is "1234567." A tag may be associated with a resource. For example, the "User_Account/1234567" tag may be associated with a resource, such as user account number 1234567. The resource may include an associated resource identifier that may be used to identify and/or reference a particular object. Users may search and filter the resources based on the tags that are associated with the resources.

In some embodiments, a resource may be associated with a tag set. A tag set may include one or more tags assigned to or otherwise associated with the resource. For example, a remote storage resource of a remote computing service may be associated with a resource identifier "bucket_1." The bucket may have, for example, three tags, such as a tag indicating an association with a user account, a tag indicating the type of access permitted by users, and a tag indicating the type of resource (e.g., computing, application execution, networking, content storage, content delivery, database management, etc.). The tag set associated with the resource may include the three identified tags.

In some embodiments, a tag may be modified (e.g., added, edited, or deleted) manually by a user or automatically by a process. For example, a user (e.g., a resource owner) may specify that a resource is to be associated with a tag and may provide the value to be used in the value-key pairing. In some embodiments, the user may indicate that all resources, existing and future resources, should automatically be tagged. For example, a rule may be generated to automatically tag resources upon creation or launching of the resource.

In some embodiments, a user may indicate that certain resources, such as a set or group of resources, be associated with a locality tag. A locality tag may indicate, for instance, a location of the resource of the remote computing service on a network or geographically. In some embodiments, locality may also indicate relationships between resources based on time, resource usage, relationship of devices, relationship of processes, or the like.

In an example embodiment, a user may wish to automatically have certain resources, such as a set or group of resources, in a remote computing service automatically tagged with a locality tag indicating locality of geography. The user may utilize a user device to access a service console or use an application programming interface (API) to indicate that one or more resources should be associated with or assigned a locality tag. The user device may transmit the indication to a tag set manager (TSM) service, which may receive the request to tag one or more resources with a locality tag. The request may specify a type of locality (e.g., network, geographic, spatial, usage, etc.). The updates to the tags (e.g., resource tag changes) may be stored in a data structure, such as a change table. In some embodiments, the change table may be stored locally, and a copy of the current change table may be transmitted to a datastore. The datastore may be accessed by additional servers in the remote computing service environment, and the data may be used to complete one or more actions by the additional servers. In some embodiments, the datastore may receive the updates to the tags (e.g., one or more resource tag changes) from the TSM service and may update the data in the datastore based on the one or more resource tag changes.

The TSM service may also transmit the one or more resource tag changes to one or more discovery services. Each of the one or more discovery services may receive the one or more resource tag changes and may use the information to augment search queries of the datastore to ensure that any query results reflect the most recent modifications to the data.

In some embodiments, a discovery service may receive a query request from a user device. The query request may include a request for a listing of resources based on one or more locality tags associated with the resources. The discovery service may generate a filter based on the information in the query request and may obtain query results from the datastore using the generated filters. In some embodiments, the discovery service may determine the datastore has not been updated with the latest changes to the tags and may use the change table received from the TSM service to update the listing of resources (e.g., query results) obtained from the datastore. In some embodiments, the update may require modifying the one or more filters and requesting additional information from the datastore using the modified filters or updating the results from the datastore using the change table.

In some embodiments, the discovery service may use the listing of resources to generate a locality graph. A locality graph may be a tool to generate a proximal representation of the relationship of resources based on locality (e.g., spatial, geographic, network, usage, etc.). In some embodiments, the discovery service may transmit the listing of resources and/or the locality graph to the user device. The discovery service may receive additional indications from the user device requesting further actions based on the listing of resources and/or the locality graph.

In some embodiments, the locality graph may be utilized by one or more services in the remote computing service environment. For example, the locality graph may be utilized to dynamically adjust access control and management of resources based on proximity to other resources. In other embodiments, the locality graph may be used to configure dynamic alarming rules to notify one or more users and/or services of changes in the proximity of the resources or the use of additional resources during the execution of one or more processes.

Although certain embodiments are described in the context of certain types of resources and tags for the purpose of illustration, any number of embodiments can be employed with a variety of different types of objects and tags.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Case and System Architecture

Figure 1:
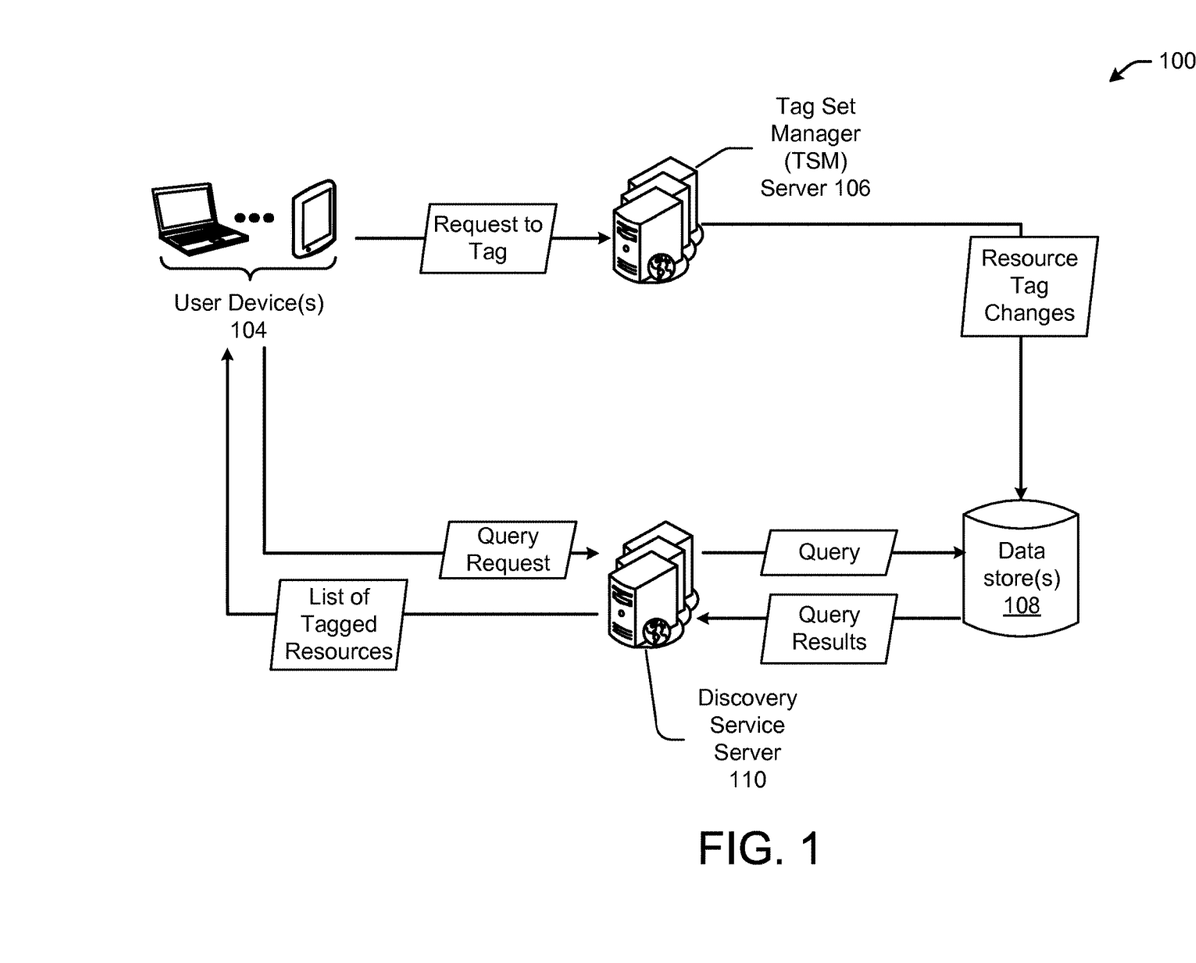
FIG. 1 depicts an illustrative data flow between various components of an illustrative system architecture for an example system for tagging resources of a remote computing service based on locality in accordance with one or more embodiments of the disclosure.

FIG. 1 depicts an illustrative data flow 100 between various components of an illustrative system architecture for an example system for tagging resources of a remote computing service based on locality in accordance with one or more embodiments of the disclosure. Illustrative user devices 104 operable by a user are depicted in FIG. 1 The one or more user devices 104 may include any suitable device capable of establishing one or more network connections to facilitate communication with one or more remote servers to manage any number of remote computing services. The one or more user devices 104 may include any suitable processor-driven computing device including, but not limited to, a smartphone or other cellular device, a tablet device, an electronic reader device, a desktop computing device, a laptop computing device, a gaming console, a multimedia content streaming device, a set-top box, and so forth. For ease of explanation, the one or more user devices 104 may be described herein in the singular; however, it should be appreciated that multiple user devices 104 operable by multiple users may be provided.

In various example embodiments, a user may operate a user device 104 to interact with a remote computing service environment. In some embodiments, the user device 104 may have a client application, a browser, and/or a command line interface which may be used to interact with the remote computing service environment. In an example embodiment, the user may operate the user device 104 to generate a request to tag certain resources, such a group or a set of resources, with a locality tag. The request may be transmitted over one or more network connections to at least one tag set manager (TSM) server 106.

In some embodiments, the user may specify a type of locality (e.g., geographic, network, spatial, usage, etc.). In some embodiments, the request may include the value that should be used to tag the specified resources. In some embodiments, the request may not include a value to use to tag a resource. The remote computing service may determine the type of locality specified by the user and may automatically tag a resource associated with the user based on the type of locality specified.

The TSM server 106 may receive the request from the user device 104. The TSM server 106 may process the request to identify the resources that will be tagged. In some embodiments, the request may have specified that all of the resources associated with the user will be tagged. In some embodiments, the request may have specified that only a subset of, or some of the resources associated with, the user will be tagged. For instance, the user may have specified that resources located on a specific network should be tagged with a network locality tag.

The TSM server 106 may include any suitable processor-driven computing device including, but not limited to, a desktop computing device, a laptop computing device, a server, a smartphone, a tablet, and so forth. For ease of explanation, the TSM server 106 may be described herein in the singular; however, it should be appreciated that multiple TSM servers 106 may be provided.

The TSM server 106 may track changes in tags associated with resources (e.g., resource tag change(s)) in a data structure, such as a change table. The change table may be stored locally on the TSM server 106. The TSM server 106 may periodically, or upon updating the change table, transmit a copy of the change table to a datastore 108 for storage.

An associated datastore 108 may be accessed by one or more TSM servers 106 in the remote computing service environment for use by the TSM servers 106 to complete processes associated with the resources.

In some embodiments, the discovery service server 110 may receive a query request for a listing of resources from one or more user devices 104. In some embodiments, the discovery service server 110 may include any suitable processor-driven computing device including, but not limited to, a desktop computing device, a laptop computing device, a server, a smartphone, a tablet, and so forth. For ease of explanation, the discovery service server 110 may be described herein in the singular; however, it should be appreciated that multiple discovery service servers 110 may be provided.

The request may include a type of locality or a value of a locality type to use in obtaining the listing of resources. The discovery service server 110 may process the query request and may generate one or more filters based on the query request. The filters may be used to obtain the requested listing of resources from the datastore 108. In some embodiments, the discovery service server 110 may communicate with the datastore 108 to retrieve data associated with the relevant resources associated with the query request. In some embodiments, the query may be applied to a set of resources associated with the user device 104. For example, the set of resources which are relevant to the query request may include all resources that are part of a group (e.g., all resources associated with a user account number or otherwise categorized as related). The query may be applied to the set of resources to obtain a listing of resources based on the query, thereby producing a listing of resources that is a subset of the set of resources. For example, the query may be applied to a set of resources where the set of resources is determined based on an owner tag associated with the resources, indicating that the owner of the resources is John Smith. The query request received from the user device 104 may indicate a request for a listing of resources located in Europe. The discovery service server 110 may apply a filter and/or a query to the set of resources owned by John Smith to identify a listing of resources located in Europe. The discovery service server 110 may receive or otherwise obtain a listing of the resources that are owned by John Smith and located in Europe, where the listing of resources is a subset of resources owned by John Smith.

In some embodiments, the datastore 108 may not have updated the stored data to include one or more resource tag changes received from the TSM server 106. The discovery service server 110 may comprise two change processors—an in-line change processor and a daemon change processor. In some embodiments, the in-line change processor may obtain information from the datastore 108 and process the data obtained from the datastore 108. The daemon change processor may execute in the background and may processes the information that the in-line change processor has not yet or was not able to processes.

In some embodiments, the discovery service server 110 may transmit the listing of resources response to the query request to the requesting user device 104. In some embodiments, the discovery service server 110 may generate a locality graph based at least in part on the listing of resources obtained using the locality tag of the resources. In some embodiments, the discovery service server 110 may generate the locality graph using information processed by one or more change processors. In some embodiments, the discovery service server 110 may transmit the locality graph to the user device 104. In some embodiments, the user device 104 may display the locality graph and/or the listing of resources to the requesting user. The user may initiate one or more actions based on the information provided in the locality graph and/or the listing of resources.

Figure 2:
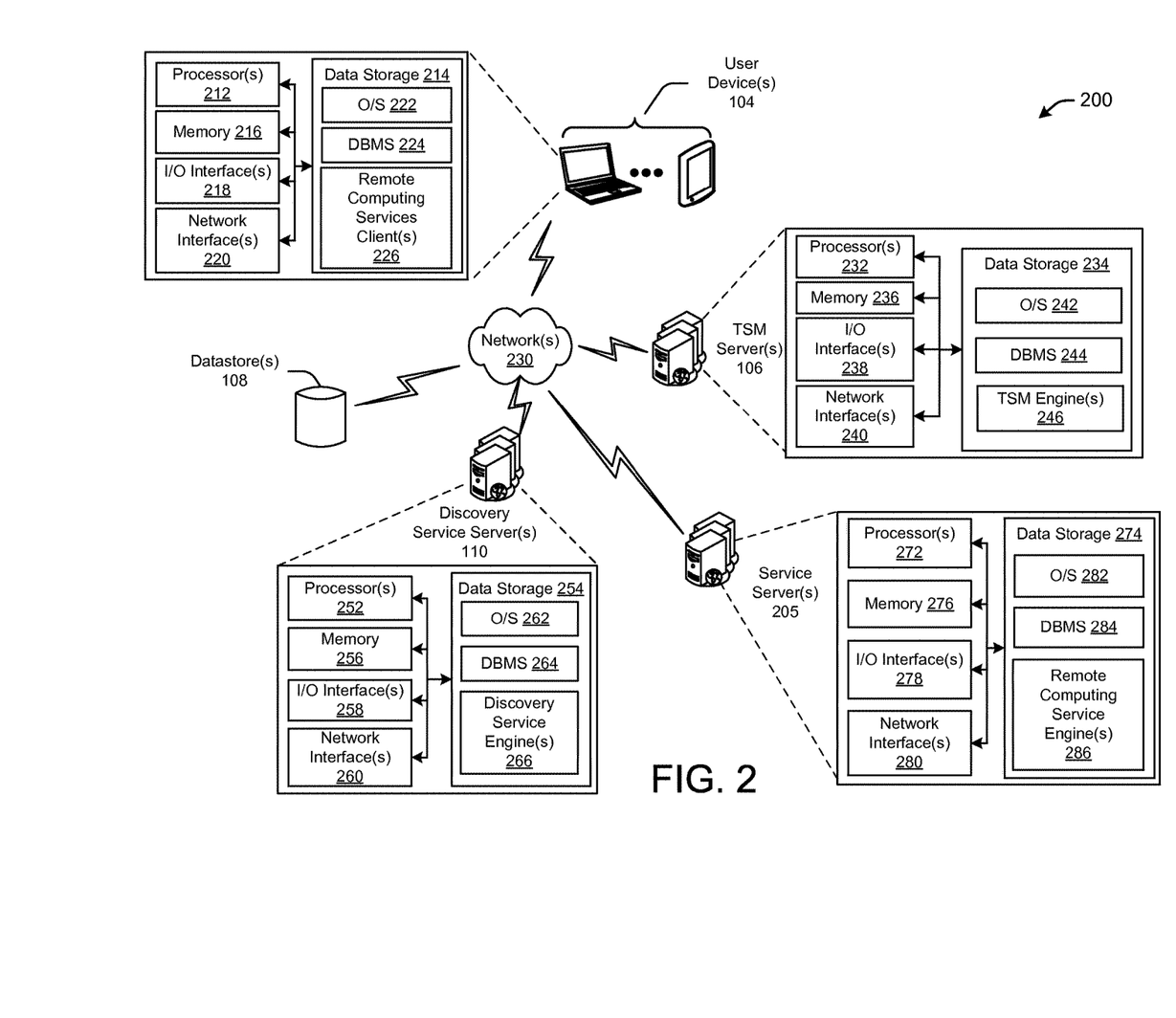
FIG. 2 is a block diagram including various hardware and software components of the illustrative system architecture depicted in FIG. 1 in accordance with one or more embodiments of the disclosure.

FIG. 2 is a block diagram of an illustrative system architecture 200 including various hardware and software components of the example data flow 100 depicted in FIG. 1 in accordance with one or more embodiments of the disclosure. FIG. 2 includes one or more user devices 104, one or more TSM servers 106, one or more datastores 108, one or more discovery service servers 110, and/or one or more service servers 205. Each component may be connected via one or more networks 230.

Any of the user devices 104, TSM servers 106, datastores 108, discovery service servers 110, and/or one or more service servers 205 may be configured to communicate with each other and any other component of the system architecture 200 via the one or more networks 230. The one or more networks 230 may include, but are not limited to, any one or a combination of different types of suitable communications networks such as, for example, cable networks, public networks (e.g., the Internet), private networks, wireless networks, cellular networks, or any other suitable private and/or public networks. Further, the one or more networks 230 may have any suitable communication range associated therewith and may include, for example, global networks (e.g., the Internet), metropolitan area networks (MANs), wide area networks (WANs), local area networks (LANs), or personal area networks (PANs). In addition, the one or more networks 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Now referring to the user devices 104, the one or more user devices 104 may include one or more processors 212 and one or more memories (referred to herein generically as memory 216). The one or more processors 212 may include any suitable processing unit capable of accepting digital data as input, processing the input data based on stored computer-executable instructions, and generating output data. The computer-executable instructions may be stored, for example, in the data storage 214 and may include, among other things, operating system software and application software. The computer-executable instructions may be retrieved from the data storage 214 and loaded into the memory 216 as needed for execution. The one or more processors 212 may be configured to execute the computer-executable instructions to cause various operations to be performed. The one or more processors 212 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 214 may store program instructions that are loadable and executable by the one or more processors 212, as well as data manipulated and generated by the one or more processors 212 during execution of the program instructions. The program instructions may be loaded into the memory 216 as needed for execution. Depending on the configuration and implementation of the one or more user devices 104, the memory 216 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 216 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The one or more user devices 104 may further include additional data storage 214 such as removable storage and/or non-removable storage including, but not limited to, magnetic storage, optical disk storage, and/or tape storage. Data storage 214 may provide non-volatile storage of computer-executable instructions and other data. The memory 216 and/or the data storage 214, removable and/or non-removable, are examples of computer-readable storage media (CRSM).

The one or more user devices 104 may further include any number of network interfaces 220 that facilitate communication between the one or more user devices 104 and other devices of the illustrative system architecture 200 (e.g., one or more TSM servers 106, discovery service servers 110, etc.) or application software via the one or more networks 230. The one or more user devices 104 may additionally include one or more input/output (I/O) interfaces 218 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 214, various program modules, applications, or the like may be stored therein that may comprise computer-executable instructions that when executed by the one or more processors 212 cause various operations to be performed. The memory 216 may have loaded from the data storage 214 one or more operating systems (O/S) 222 that may provide an interface between other application software (e.g., dedicated applications, a browser application, a web-based application, a distributed client-server application, etc.) executing on the one or more user devices 104 and the hardware resources of the user devices 104. More specifically, the O/S 222 may include a set of computer-executable instructions for managing the hardware resources of the one or more user devices 104 and for providing common services to other application programs (e.g., managing memory allocation among various application programs). The O/S 222 may include any operating system now known or which may be developed in the future including, but not limited to, any mobile operating system, desktop or laptop operating system, mainframe operating system, or any other proprietary or open-source operating system.

The data storage 214 may further include one or more database management systems (DBMS) 224 for accessing, retrieving, storing, and/or manipulating data stored in one or more datastores. The DBMS 224 may use any of a variety of database models (e.g., relational model, object model, etc.) and may support any of a variety of query languages.

The data storage 214 may additionally include various other program modules that may include computer-executable instructions for supporting a variety of associated functionality. For example, the data storage 214 may include one or more remote computing service clients 226.

The one or more remote computing service clients 226 may include computer-executable instructions that in response to execution by the one or more processors 212 cause operations to be performed including initiating, accessing, or managing the remote computing service. In some embodiments, the one or more remote computing service clients 226 may provide a management console, a command line interface, and/or an API to enable a user of the user device 104 to interface with the remote computing service. In some embodiments, the user device 104 may enable a user to request resources to be tagged (e.g., locality tags), request a listing of resources based on information provided via the one or more remote computing service clients 226, and launch and/or monitor processes in the remote computing service environment.

Within the data storage 214, one or more modules may be stored. As used herein, the term module may refer to a functional collection of instructions that may be executed by the one or more processors 212. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Now referring to the TSM servers 106, the one or more TSM servers 106 may include one or more processors 232 and one or more memories (referred to herein generically as memory 236). The one or more processors 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The one or more processors 232 may be configured to execute the computer-executable instructions to cause various operations to be performed. The one or more processors 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the one or more processors 232, as well as data manipulated and generated by the one or more processors 232 during execution of the program instructions. The program instructions may be loaded into the memory 236 as needed for execution. Depending on the configuration and implementation of the one or more TSM servers 106, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The one or more TSM servers 106 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The one or more TSM servers 106 may further include any number of network interfaces 240 that facilitate communication between the one or more TSM servers 106 and other devices of the illustrative system architecture 200 (e.g., datastore 108, discovery service server 110, etc.) or application software via the one or more networks 230. The one or more TSM servers 106 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 234, various program modules, applications, or the like may be stored therein that may comprise computer-executable instructions that when executed by the one or more processors 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the one or more TSM servers 106 and the hardware resources of the one or more TSM servers 106. More specifically, the O/S 242 may include a set of computer-executable instructions for managing the hardware resources of the one or more TSM servers 106 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more TSM engines 246.

The one or more TSM engines 246 may include computer-executable instructions that in response to execution by the one or more processors 232 cause operations to be performed including receiving requests from a user device 104 to modify (e.g., add, delete, edit, etc.) tags associated with the resources of a remote computing service. The one or more TSM engines 246 may update one or more data structures (e.g., a change table) to reflect changes to be made to the tags associated with the resources. In some embodiments, the one or more TSM engines 246 may maintain and modify the change table locally. In some embodiments, the change table may be stored remotely and the one or more TSM engines 246 may be responsible for updating the change table and alerting or notifying relevant entities in the system architecture 200 of the changes. In some embodiments, the one or more TSM engines 246 may generate one or more rules to apply or associate tags with future resources, for example, associated with the user device 104.

Within the data storage 234, one or more modules may be stored. As used herein, the term module may refer to a functional collection of instructions that may be executed by the one or more processors 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The one or more discovery service servers 110 may include one or more processors 252 and one or more memories (referred to herein generically as memory 256). The one or more processors 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The one or more processors 252 may be configured to execute the computer-executable instructions to cause various operations to be performed. The one or more processors 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the one or more processors 252, as well as data manipulated and generated by the one or more processors 252 during execution of the program instructions. The program instructions may be loaded into the memory 256 as needed for execution. Depending on the configuration and implementation of the one or more discovery service servers 110, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The one or more discovery service servers 110 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The one or more discovery service servers 110 may further include any number of network interfaces 260 that facilitate communication between the one or more discovery service servers 110 and other devices of the illustrative system architecture 200 (e.g., one or more TSM servers 106, datastores 108, etc.) or application software via the one or more networks 230. The one or more discovery service servers 110 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 254, various program modules, applications, or the like may be stored therein that may comprise computer-executable instructions that when executed by the one or more processors 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the one or more discovery service servers 110 and the hardware resources of the one or more discovery service servers 110. More specifically, the O/S 262 may include a set of computer-executable instructions for managing the hardware resources of one or more discovery service servers 110 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or content discovery service engines 266.

The one or more discovery service engines 266 may include computer-executable instructions, code, or the like, that, responsive to execution by the one or more processors 252, may cause the one or more discovery service engines 266 to retrieve a listing of resources from at least one datastore 108 based on data (e.g., parameters, tags, etc.) received from a user device 104. The one or more discovery service engines 266 may generate one or more filters using the data received from the user device 104 and may use the filters to obtain the listing of resources from the datastore 108. In some embodiments, the one or more discovery service engines 266 may also receive one or more resource tag changes from the one or more TSM servers 106. The one or more resource tag changes may not have been propagated to the datastore 108, so the one or more discovery service engines 266 may apply the one or more resource tag changes to the filter, the listing of resources, or other data, as necessary, to obtain an updated listing of resources responsive to the request from the user device 104.

Within the data storage 254, one or more modules may be stored. As used herein, the term module may refer to a functional collection of instructions that may be executed by the one or more processors 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The one or more service servers 205 may include one or more processors 272 and one or more memories (referred to herein generically as memory 276). The one or more processors 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from the data storage 274 and loaded into the memory 276 as needed for execution. The one or more processors 272 may be configured to execute the computer-executable instructions to cause various operations to be performed. The one or more processors 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the one or more processors 272, as well as data manipulated and generated by the one or more processors 272 during execution of the program instructions. The program instructions may be loaded into the memory 276 as needed for execution. Depending on the configuration and implementation of the one or more service servers 205, the memory 276 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 276 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The one or more service servers 205 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 276 and/or the data storage 274, removable and/or non-removable, are examples of computer-readable storage media (CRSM).

The one or more service servers 205 may further include any number of network interfaces 280 that facilitate communication between the one or more service servers 205 and other devices of the illustrative system architecture 200 (e.g., one or more datastores 108, discovery service servers 110, etc.) or application software via the one or more networks 230. The one or more service servers 205 may additionally include one or more input/output (I/O) interfaces 278 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 274, various program modules, applications, or the like may be stored therein that may comprise computer-executable instructions that when executed by the one or more processors 272 cause various operations to be performed. The memory 276 may have loaded from the data storage 274 one or more operating systems (O/S) 282 that may provide an interface between other application software (e.g., dedicated applications, a browser application, a web-based application, a distributed client-server application, etc.) executing on the one or more service servers 205 and the hardware resources of the one or more service servers 205. More specifically, the O/S 282 may include a set of computer-executable instructions for managing the hardware resources of the one or more service servers 205 and for providing common services to other application programs (e.g., managing memory allocation among various application programs). The O/S 282 may include any operating system now known or which may be developed in the future including, but not limited to, any mobile operating system, desktop or laptop operating system, mainframe operating system, or any other proprietary or open-source operating system.

The data storage 274 may further include one or more database management systems (DBMS) 284 for accessing, retrieving, storing, and/or manipulating data stored in one or more datastores. The DBMS 284 may use any of a variety of database models (e.g., relational model, object model, etc.) and may support any of a variety of query languages.

The data storage 274 may additionally include various other program modules that may include computer-executable instructions for supporting a variety of associated functionality. For example, the data storage 274 may include one or more remote computing service engines 286.

The one or more remote computing service engines 286 may include computer-executable instructions, code, or the like, that, responsive to execution by the one or more processors 272, may provide one or more remote computing services. Remote computing services may include, but are not limited to, virtual computer services, block-level data storage services, cryptography services, on-demand data storage services, notification services, authentication services, policy management services, task services, and/or other services. The one or more remote computing service engines 286 may include a virtual computer system service. A virtual computer system service may be a collection of computing resources configured to instantiate virtual machine instances on behalf of the user. The user may interact with the virtual computer system service (e.g., via appropriately configured and authenticated API calls) to provision and operate one or more virtual computer systems that are instantiated on the physical computing devices hosted and operated by the one or more service servers 205. The virtual computer systems may be used for various purposes, such as to operate as servers supporting a website, to operate business applications or, generally, to serve as computing power for the user. Other applications for the virtual computer systems may support database applications, electronic commerce applications, business applications, and/or other applications. Although the virtual computer system service is described in relation to the one or more service servers 205, any other computer system or computer system service may be utilized in the remote computing service environment, such as a computer system or a computer system service that does not employ virtualization or instantiation and instead provisions computing resources on dedicated or shared computers/servers and/or other physical devices.

The one or more remote computing service engines 286 may include a block-level data storage service. A block-level data storage service may include one or more computing resources that collectively operate to store data for a user using block-level storage devices (and/or virtualizations thereof). The block-level storage devices of the block-level data storage service may, for example, be operationally attached to one or more virtual computer systems provided by the virtual computer system service to serve as logical units (e.g., virtual drives) for the computer systems. A block-level storage device may enable the persistent storage of data used/generated by a corresponding virtual computer system service where the virtual computer system service may only provide ephemeral data storage.

The one or more remote computing service engines 286 may include a cryptography service. A cryptography service may utilize one or more storage services of the one or more service servers 205 to store keys of the users in encrypted form, whereby the keys may be usable to decrypt user keys accessible only to particular devices of the cryptography service.

The one or more remote computing service engines 286 may include an on-demand data storage service. An on-demand data storage service may be a collection of computing resources configured to synchronously process requests to store and/or access data. The on-demand data storage service may operate using computing resources (e.g., databases) that enable the on-demand data storage service to locate and retrieve data quickly, and to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, the data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

The one or more remote computing service engines 286 may include a notification service. The notification service may include a collection of computing resources collectively configured to provide a web service or other interface and browser-based management console. The management console can be used to configure topics for which users seek to receive notifications, configure applications (or people), subscribe clients to the topics, publish messages, or configure delivery of the messages over clients' protocol of choice (e.g., hypertext transfer protocol (HTTP), e-mail and short message service (SMS), among others). The notification service may provide notifications to clients (e.g., a user) using a "push" mechanism without the need to check periodically or "poll" for new information and updates. The notification service may further be used for various purposes such as monitoring applications executing in the virtual computer system service, workflow systems, time-sensitive information updates, mobile applications, and many others.

The one or more remote computing service engines 286 may include an authentication system service. An authentication service, in an embodiment, may be a computer system (e.g., a collection of computing resources) configured to perform operations involved in authentication of users of the user device. For instance, one of the services described herein may provide information from a user to the authentication system to receive information in return that indicates whether the user requests are authentic.

The one or more remote computing service engines 286 may include a policy management service. A policy management service, in an embodiment, may be a computer system configured to manage policies on behalf of users of the one or more service servers 205. The policy management service may include an interface that enables users to submit requests related to the management of policy. Such requests may, for instance, be requests to add, delete, change, or otherwise modify policy for a user or for other administrative actions, such as providing an inventory of existing policies and the like.

The one or more remote computing service engines 286 may include a task service. A task service may be configured to receive a task package from the user and enable executing tasks as dictated by the task package. The task service may be configured to use any resource of the one or more service servers 205, such as one or more instantiated virtual machines or virtual hosts, for executing the task. The task service may configure the one or more instantiated virtual machines or virtual hosts to operate using a selected operating system and/or a selected execution application in accordance with a need or a specification of the user.

The one or more remote computing service engines 286 may maintain one or more other services. The other services may be based at least in part on the needs of their users. For instance, a particular remote computing service engine 286 may maintain a database service for its users. A database service may be a collection of computing resources that collectively operate to run one or more databases for one or more users. The user may operate and manage a database from the database service by utilizing appropriately configured API calls. This, in turn, may allow a user to maintain and potentially scale the operations in the database. Other services include, but are not limited to, object-level archival data storage services, and services that manage and/or monitor other services.

Within the data storage 274, one or more modules may be stored. As used herein, the term module may refer to a functional collection of instructions that may be executed by the one or more processors 272. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The datastore 108 may be accessible by components of the system architecture 200 that store data generated by different components of the system architecture 200 (e.g., one or more resource tag changes). While the illustrated embodiment depicts a certain number of components, other embodiments may include additional or fewer components.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of the hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as submodules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Figure 3A:
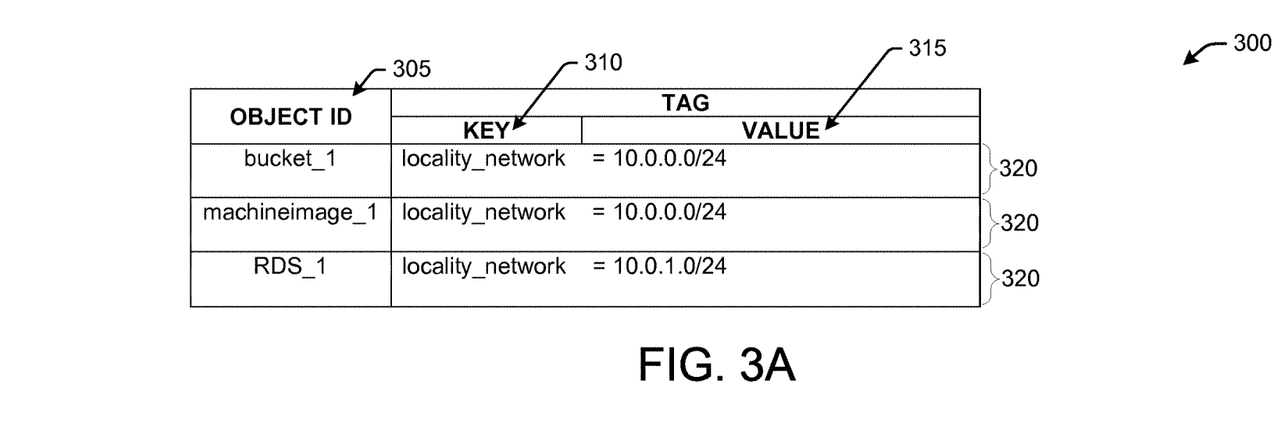
FIGS. 3A-3B are tables that illustrate example object tags in accordance with one or more embodiments of the disclosure.
Figure 3B:
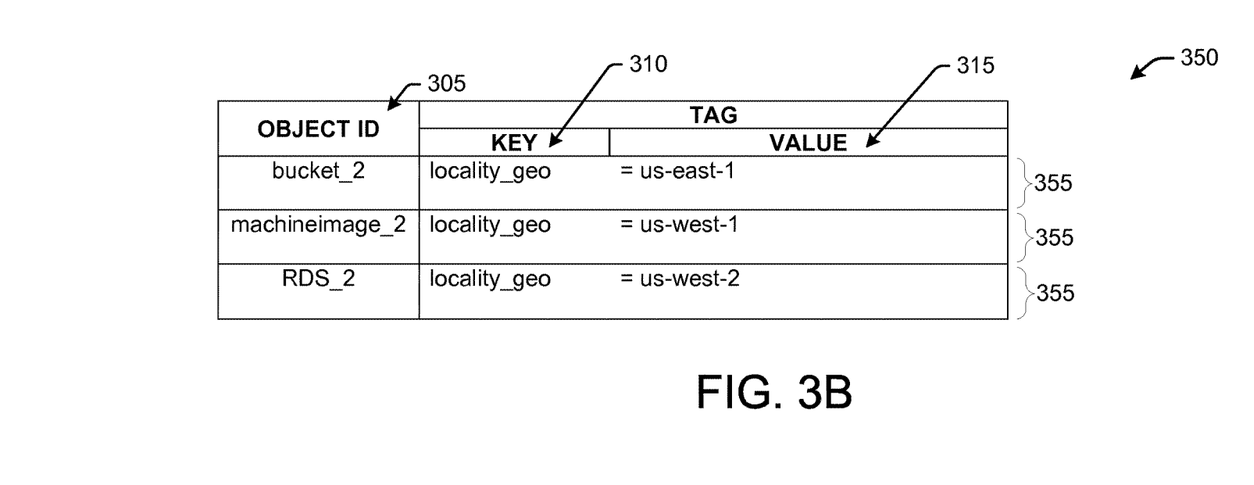

FIGS. 3A and 3B are tables that illustrate example object tags in accordance with one or more embodiments of the disclosure. FIG. 3A is a table 300 that illustrates example network locality tags 320 for network locality in accordance with one or more embodiments. FIG. 3B is a table 350 that illustrates example geographic locality tags 355 for geographic locality in accordance with one or more embodiments. In the illustrated embodiment, the table 300 of FIG. 3A may include a tag 320 for each of the objects having object identifiers 305 of "bucket_1", "machineimage_1", and "RDS_1." Each of the tags 320 may include a key 310 and a corresponding value 315. For example, the identifier "bucket_1" may correspond to a remote storage resource and the tag 320 associated therewith may be a "locality- _network" tag 320 that has a value of 10.0.0.0/24; the identifier "machineimage_1" may correspond to a virtual machine image of the remote computing service and the tag 320 associated therewith may be a "locality_network" tag 320 that has a value of 10.0.0.0/24; and the identifier "RDS_1" may correspond to a distributed relational database of the remote computing service and the tag 320 associated therewith may be a "locality_network" tag 320 that has a value of 10.0.1.0/24. The locality_network tags associated with bucket_1 and machineimage_1 indicate that bucket_1 and machineimage_1 are in the same sub-network, whereas RDS_1 resides on a different sub-network.

In the illustrated embodiment, the table 350 of FIG. 3B includes tags 355 for each of the resource objects having object identifiers 305 of "bucket_2," "machineimage_2," and "RDS_2." Each of the tags 355 may include a key 310 and a corresponding value 315. For example, the identifier "bucket_2" may correspond to a remote storage resource and the tag 355 associated therewith may be a "locality_geo" tag 355 that has a value of us-east-1; the identifier "machineimage_2" may correspond to a virtual machine image of the remote computing service and the tag 355 associated therewith may be a "locality_geo" tag 355 that has a value of us-west-1; and the identifier "RDS_2" may correspond to a distributed relational database of the remote computing service and the tag 355 associated therewith may be a "locality_geo" tag 355 that has a value of us-west-2. The locality_geo tag associated with bucket_2 indicates that the resource is located in the east region of the United States, whereas the locality_geo tags associated with machineimage_2 and RDS_2 indicate that both machineimage_2 and RDS_2 are in similar geographic areas (e.g., the western region of the United States), but may be in different availability zones (e.g., different areas within the same data center, where each of the availability zones may have different networks, power supplies, physical security, and the like). Although the locality tags for network locality and geographic locality are depicted as different tags, in some embodiments, the locality tag may be a single tag, and the value of the tag may indicate that type of locality. For example, the locality tag key may be "locality," and the value of the tag may be interpreted to determine the type of locality (e.g., a numerical value, such as 10.0.0.0/24, may indicate a network locality, whereas a string value, such as "us-west-3," may indicate a geographic locality).

Illustrative Processes

Figure 4:
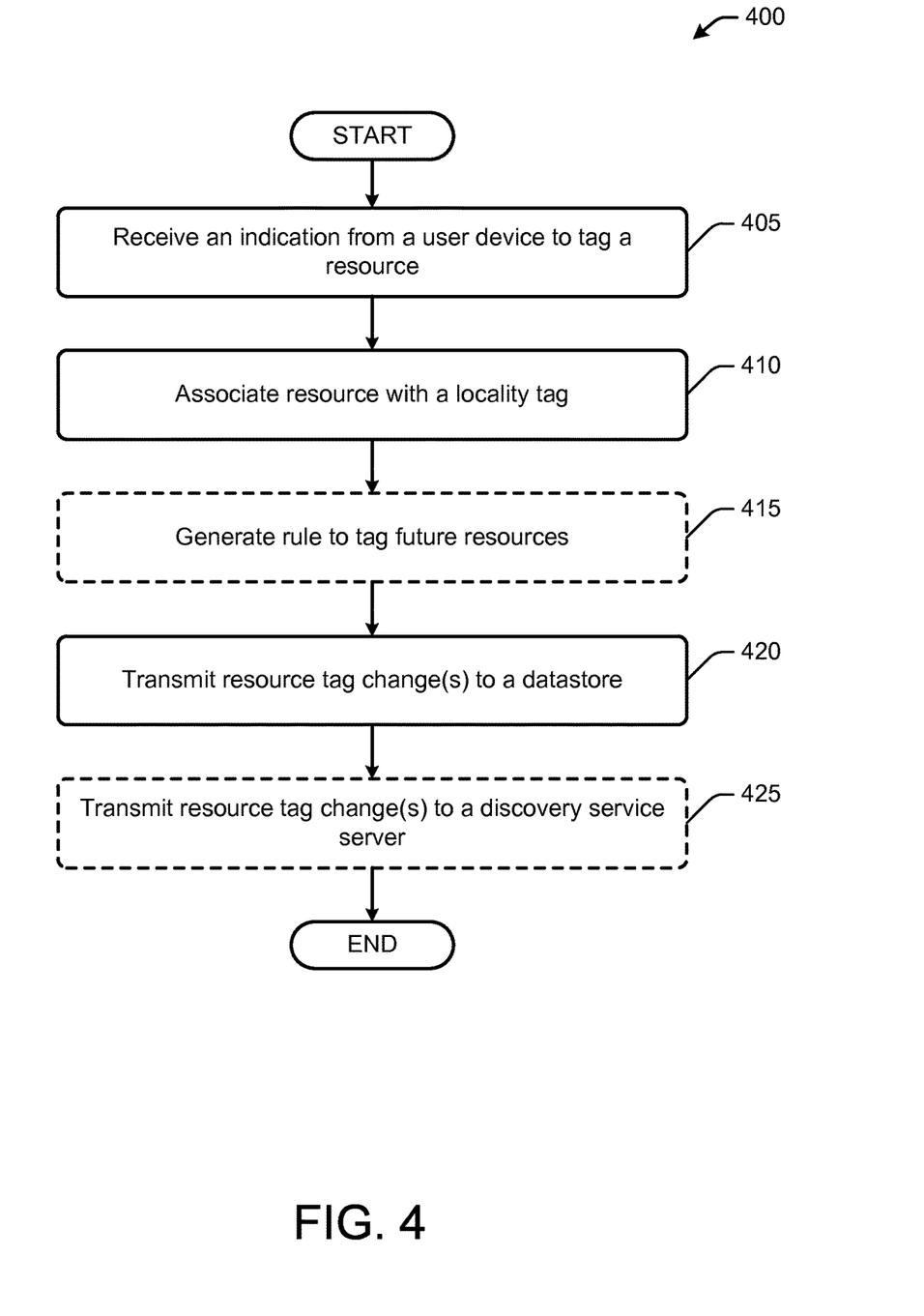
FIG. 4 is an illustrative process flow diagram of an example method for tagging resources of a remote computing service based on locality in accordance with one or more embodiments of the disclosure.

FIG. 4 is an illustrative process flow diagram of a method 400 for tagging resources of a remote computing service based on locality in accordance with one or more embodiments of the disclosure. At block 405, a TSM server 106 may receive an indication from a user device 104 to tag one or more resources of a remote computing service. In some embodiments, the indication may include the type of locality tag to associate with the one or more resources. For example, the indication may specify that the locality is a network locality, a geographic locality, a usage locality, a time locality, or the like. In some embodiments, the indication may identify an existing resource to tag with the locality tag 320

At block 410, the TSM server 106 may associate the resource with a locality tag. In some embodiments, the TSM server 106 may identify a specified locality from the indication from the user device 104 and may associate the locality in the locality tag of the resource. In some embodiments, the indication from the user device 104 may indicate a type of locality to associate with the resource and instructions to detect a current locality of the resource and associate the current locality as a tag of the resource. The TSM server 106 may track the resource tag change(s), for example, in a data structure, such as a change table. In some embodiments, the change table may be stored locally and a copy of the change table may be periodically transmitted to the datastore 108 and/or the discovery service server 110 as described below. In some embodiments, the change table may be stored remotely and the TSM server 106 may update the change table over one or more network connections.

At block 415, the TSM server 106 may optionally generate a rule to tag future resources. In some embodiments, if the user has indicated a type of locality tag and instructions to automatically generate and associate locality tags, the TSM server 106 may generate one or more rules to apply to future resources to be instantiated or launched in association with the user device 104 (e.g., a user account number, a user identifier, etc.) to detect and associate locality tags with the resources.

At block 420, the TSM server 106 may transmit one or more resource tag changes to a datastore 108. In some embodiments, the TSM server 106 may transmit the change table containing the updates to the resources and associated tags to the datastore 108. In some embodiments, the one or more resource tag changes may be transmitted to the datastore 108 in one or more messages. In some embodiments, the TSM server 106 may transmit a notification of updates to the change table to the datastore 108 so that the datastore 108 may retrieve the updates from the change table.

At optional block 425, the TSM server 106 may transmit the one or more resource tag changes to a discovery service server 110. In some embodiments, the discovery service server 110 may receive a change table from the TSM server 106. In some embodiments, the discovery service server 110 may receive a notification that a remotely stored change table has been updated, and the discovery service server 110 may obtain the changes from the remote change table. In some embodiments, the datastore 108 may receive the one or more resource tag changes from the TSM server 106 but may not immediately process the changes and update the datastore 108, which may cause a delay in the remote computing service being able to obtain the updated tags associated with the resources. The TSM server 106 may transmit the one or more resource tag changes to the discovery service server 110 to be used in conjunction with retrieving data from the datastore 108 so that the discovery service server 110 may provide updated tags associated with the resources even if the datastore 108 has not been updated with the one or more resource tag changes. In some embodiments, once the datastore 108 has been updated to reflect the one or more resource tag changes, the discovery service server 110 may expunge the one or more resource tag changes received from the TSM server 106.

For example, in some embodiments, the discovery service server 110 may include at least an in-line change processor and a daemon change processor. The in-line change processor may receive the one or more resource tag changes from the TSM server 106 and may process the changes as it receives the resource tag changes. In some embodiments, the daemon change server may execute as a background process and may process items that the in-line change processor is unable to process to ensure that the changes received from the TSM server 106 are processed and available to users immediately.

In some embodiments, the in-line change processor and daemon change processor may receive data from the datastore 108 and may process the received data. The in-line change processor may process the data as it is received and/or obtained from the datastore 108. The daemon change processor may execute in the background and may process data that the in-line change processor did not process.

Figure 5:
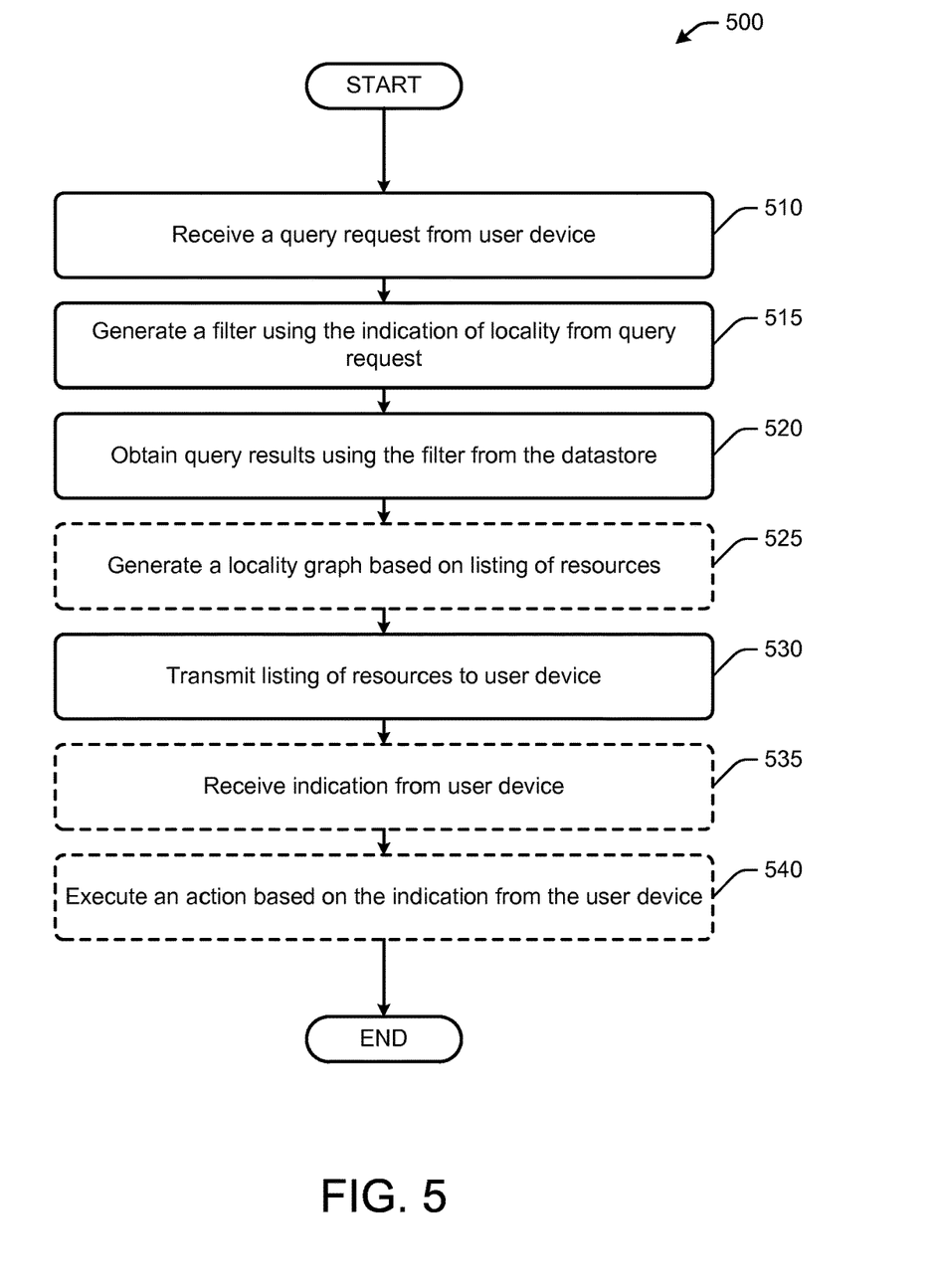
FIG. 5 is an illustrative process flow diagram of an example method for utilizing locality tags associated with the resources of a remote computing service in accordance with one or more embodiments of the disclosure.

FIG. 5 is an illustrative process flow diagram of a method 500 for utilizing locality tags associated with the resources of a remote computing service in accordance with one or more embodiments of the disclosure. At block 510, the discovery service server 110 may receive a query request from a user device 104. In some embodiments, the request may specify one or more parameters to apply in a search query, such as, for example, a locality tag. The request may request a listing of resources associated with one or more networks or one or more geographic regions.

At block 515, the discovery service server 110 may generate a filter using the indication of locality from the query request. For example, if the query request specified a type of locality and a specific value for the locality tag (e.g., geographic locality and resources located in the western region of the United States), the discovery service server 110 may generate a filter using the type of locality and the value of the locality obtained from the query request.

At block 520, the discovery service server 110 may obtain query results using the filter from the datastore 108. In some embodiments, the discovery service server 110 may also apply the one or more resource tag changes received in block 505 to the query results obtained from the datastore 108 to ensure that the query results reflect the most up-to-date information to provide in response to the received query request.

At optional block 525, the discovery service server 110 may dynamically generate a locality graph based on the listing of resources. In some embodiments, the locality graph may be generated in response to obtaining the listing of resources. In some embodiments, the locality graph may be generated in response to a requesting server in the remote computing service environment. In some embodiments, the locality graph may indicate a proximal relationship between the resources, which may be represented as nodes in the locality graph. In some embodiments, the relationships between the nodes may be weighted based on user-provided data (e.g., resources within the same geographic area or network may be given higher weights, etc.) and may be depicted as such in the locality graph. In some embodiments, the locality graph may be dynamically updated as information is received from the TSM server 106 and/or additional servers in the remote computing service environment.

At block 530, the discovery service server 110 may transmit the listing of resources to the user device 104 in response to the received request. In some embodiments, the discovery service server 110 may transmit the listing of resources and/or the locality graph to the user device 104. In some embodiments, the locality graph may be dynamically generated on the user device 104 based on the information received in the listing of resources transmitted to the user device 104.

At optional block 535, the discovery service server 110 may receive an indication from the user device 104 to initiate or execute an action. In some embodiments, the action may be to query resources based on locality or proximity to each other using the dynamically generated locality graph. For example, the indication from the user device 104 may request a second listing of resources, filtering the first listing of resources based on the relative or proximal location of the resources from a given locality.

In another example, the action may be modifying access control for resources based on the locality graph. For example, the discovery service server 110 may generate one or more rules to modify access controls associated with one or more resources based on the distance between resources in a locality graph. In some embodiments, the distance may be defined as the number of hops or connections between nodes (e.g., resources) in the locality graph. For example, a rule may specify that resources outside of a geographic location by more than one hop in the graph are automatically denied access. In some embodiments, a rule may specify that the resources within a pre-determined number of hops from a resource or a node in the locality graph may be granted access. Accordingly, such rules may allow resources to have dynamic access control based upon the specifics of a particular set of transactions or processes.

In some embodiments, the action may be to proactively configure dynamic alarming rules that permit notifications, alerts, and/or alarms based on the distance between nodes in the locality graph. In some embodiments, services within the remote computing service may be able to be alerted to the activities of other services which may trigger one or more alarms based on their location or proximity in the locality graph. Such dynamic alarming configurations may enable self-healing of services within the remote computing service by identifying potential vulnerabilities in processes that span different types of resources within the remote computing service.

At optional block 540, the discovery service server 110 may execute an action based on the indication from the user device 104. In some embodiments, the execution of the action may be to configure rules and/or policies, such as the dynamic alarming service based on the locality graph. In some embodiments, execution of an action may be receiving information from a user device used to configure a process pipeline based on the available resources displayed in the listing of resources and/or a locality graph to ensure efficient execution of a process by identifying the resources based on their locality.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
receiving, by one or more processors, from a user device, a first request to associate each of a set of resources of a remote computing service with a locality tag;
associating, by the one or more processors, each of the set of resources with the locality tag;
receiving, by the one or more processors, a second request for a listing of resources, wherein the second request comprises a locality type and a locality value;
generating, by the one or more processors, a filter using the locality type and the locality value of the second request;
obtaining, by the one or more processors and using the locality tag, the listing of resources using the filter, wherein the listing of resources is a subset of the set of resources, and wherein each of the subset of the set of resources satisfies the locality type and the locality value;
generating, by the one or more processors, a locality graph using the listing of resources, wherein the locality graph is indicative of respective proximities of each resource of the subset of the set of resources to each other resource of the subset of the set of resources; and
applying, by the one or more processors, a rule for dynamic access control of resources to the subset of the set of resources, wherein the rule uses the respective proximities indicated in the locality graph.

2. The method of claim 1, further comprising:
configuring, by the one or more processors, the rule for dynamic access control of resources, wherein the rule is configured using an indication received from a user device.

3. The method of claim 1, further comprising:
transmitting, by the one or more processors, the filter to a datastore; and
receiving, by the one or more processors, the listing of resources from the datastore, wherein the listing of resources is obtained from a query of the datastore using the filter.

4. The method of claim 1, wherein the locality tag is indicative of a network locality, a geographic locality, a spatial locality, a usage locality, or a time locality.

5. A method comprising:
receiving, by one or more processors, a request for a listing of resources of a remote computing service, wherein the request comprises a locality type and a locality value, and the listing of resources is indicative of a subset of a plurality of resources of the remote computing service;
generating, by the one or more processors, a filter using the locality type and the locality value;
obtaining, by the one or more processors, the listing of resources using the filter, wherein each of the subset of the plurality of resources satisfies the locality type and the locality value;
generating, by the one or more processors, a locality graph using the listing of resources, wherein the locality graph is indicative of respective proximities of each resource of the subset of the plurality of resources to each other resource of the subset of the plurality of resources;
transmitting, by the one or more processors, the locality graph to a user device; and
executing, by the one or more processors, an action using the respective proximities indicated in the locality graph.

6. The method of claim 5, further comprising:
transmitting, by the one or more processors, the filter to a datastore; and
receiving, by the one or more processors, the listing of resources from the datastore, wherein the listing of resources is obtained from a query of the datastore using the filter.

7. The method of claim 5, further comprising:
receiving, by the one or more processors, a data structure, wherein the data structure comprises data indicative of changes to a locality tag associated with a resource;
generating, by the one or more processors, an updated listing of resources using the data from the data structure; and
transmitting, by the one or more processors, the updated listing of resources to the user device.

8. The method of claim 7, wherein the locality tag is indicative of a network locality, a geographic locality, a spatial locality, a usage locality, or a time locality.

9. The method of claim 5, further comprising:
receiving, by the one or more processors, from a user device, a second request to associate each of the plurality of resources of the remote computing service with a locality tag; and
associating, by the one or more processors, each of the plurality of resources with the locality tag.

10. The method of claim 5, further comprising:
receiving, by the one or more processors, from a user device, an indication to execute the action; and
executing, by the one or more processors, the action in response to receiving the indication.

11. The method of claim 10, wherein the action is associated with dynamic access control of one or more resources and the method further comprises:
configuring, by the one or more processors, a rule for dynamic access control of resources, wherein the rule is configured using the indication from the user device; and
applying, by the one or more processors, the rule for dynamic access control of resources to the subset of the plurality of resources, wherein the rule uses information from the locality graph.

12. The method of claim 5, wherein the action is configuring a rule for dynamic alarming, wherein the rule is configured to notify a user or a service of changes in proximity of resources during execution of a process.

13. A system comprising:
at least one memory that stores computer-executable instructions;
at least one processor configured to access the at least one memory and execute the computer-executable instructions to:
receive a request for a listing of resources of a remote computing service, wherein the request comprises a locality type and a locality value, and the listing of resources is indicative of a subset of a plurality of resources of the remote computing service;
generate a filter using the locality type and the locality value;
obtain the listing of resources using the filter, wherein each of the subset of the plurality of resources satisfies the locality type and the locality value;
generate a locality graph using the listing of resources, wherein the locality graph is indicative of respective proximities of each resource of the subset of the plurality of resources to each other resource of the subset of the plurality of resources;
transmit the locality graph to a user device; and
execute an action using the respective proximities indicated in the locality graph.

14. The system of claim 13, wherein the at least one processor is configured to access the at least one memory and to further execute the computer-executable instructions to:
transmit the filter to a datastore; and
receive the listing of resources from the datastore, wherein the listing of resources is obtained from a query of the datastore using the filter.

15. The system of claim 13, wherein the at least one processor is configured to access the at least one memory and to further execute the computer-executable instructions to:
receive a data structure, wherein the data structure comprises data indicative of changes to a locality tag associated with a resource;
generate an updated listing of resources using the data from the data structure; and
transmit the updated listing of resources to the user device.

16. The system of claim 15, wherein the locality tag is indicative of a network locality, a geographic locality, a spatial locality, a usage locality, or a time locality.

17. The system of claim 13, wherein the at least one processor is configured to access the at least one memory and to further execute the computer-executable instructions to:
receive, from a user device, a second request to associate each of the plurality of resources of the remote computing service with a locality tag; and
associate each of the plurality of resources with the locality tag.

18. The system of claim 13, wherein the at least one processor is configured to access the at least one memory and to further execute the computer-executable instructions to:
receive, from a user device, an indication to execute the action; and
execute the action in response to receiving the indication.

19. The system of claim 18, wherein the action is associated with dynamic access control of one or more resources, and wherein the at least one processor is configured to access the at least one memory and to further execute the computer-executable instructions to:
configure a rule for dynamic access control of resources, wherein the rule is configured using the indication from the user device; and
apply the rule for dynamic access control of resources to the subset of the plurality of resources, wherein the rule uses information from the locality graph.

20. The system of claim 13, wherein the action is configuring a rule for dynamic alarming, wherein the rule is configured to notify a user or a service of changes in proximity of resources during execution of a process.

* * * * *